United States Patent [19]

Song et al.

[11] Patent Number: 5,461,123

[45] Date of Patent: Oct. 24, 1995

[54] GAS PHASE FLUIDIZED BED POLYOLEFIN POLYMERIZATION PROCESS USING SOUND WAVES

[75] Inventors: Gyung-Ho Song, Seoul, Rep. of Korea; Kiu H. Lee, South Charleston; Roger B. Painter, Scott Depot, both of W. Va.

[73] Assignee: Union Carbide Chemicals & Plastics Technology Corporation, Danbury, Conn.

[21] Appl. No.: 274,840

[22] Filed: Jul. 14, 1994

[51] Int. Cl.[6] .................................................. C08F 2/34
[52] U.S. Cl. ................................ 526/74; 526/88; 526/901
[58] Field of Search .................................. 526/74, 88, 901

[56] References Cited

U.S. PATENT DOCUMENTS 4,396,434  8/1983  Forster ........................................ 134/1
4,461,651  7/1984  Hall ............................................. 134/1
4,650,413  3/1987  Olsson et al. ............................... 431/1

FOREIGN PATENT DOCUMENTS 2125314     3/1984   United Kingdom.
WO7901019  11/1979   WIPO.

*Primary Examiner*—Joseph L. Schofer
*Assistant Examiner*—Tom Weber
*Attorney, Agent, or Firm*—B. L. Deppenbrock

[57] ABSTRACT

An improved method for polymerizing one or more polyolefins in the presence of a transition metal catalyst in at least one gas phase fluidized bed reactor, the improvement comprises generating at least one low frequency, high pressure sound wave inside a reactor system, which wave has sufficient frequency and pressure to dislodge and/or prevent particle build-up on interior surfaces of the reactor system.

9 Claims, No Drawings

GAS PHASE FLUIDIZED BED POLYOLEFIN POLYMERIZATION PROCESS USING SOUND WAVES

FIELD OF THE INVENTION

This invention relates to an improved gas phase fluidized bed polyolefin polymerization process. More particularly, the present invention is directed to the use of one or more sound waves to improve polyolefin polymerization in a gas phase fluidized bed reactor system.

BACKGROUND OF THE INVENTION

The introduction of high activity Ziegler-Natta catalyst systems has led to the development of new polymerization processes based on gas phase reactors as disclosed in U.S. Pat. No. 4,482,687, issued Nov. 13, 1984. These processes offer many advantages over bulk monomer slurry processes or solvent processes. They are more economical and inherently safer in that they eliminate the need to handle and recover large quantities of solvent while advantageously providing low pressure process operation.

The versatility of the gas phase fluid bed reactor has contributed to its rapid acceptance. Alpha-olefin polymers produced in this type of reactor cover a wide range of density, molecular weight distribution and melt indexes. In fact new and better products have been synthesized using single- and multiple-, or staged-, gas phase reactor systems because of the flexibility and adaptability of the gas phase reactor to a large spectrum of operating conditions.

Conventional gas phase fluidized bed reactors used in polymerizing alpha-olefins have a cylindrical shaped fluidized bed portion and an enlarged, tapered-conical entrainment disengaging section, sometimes referred to as the expanded section or transition section. The enlarged entrainment disengaging section is employed to minimize the quantity of fine powder, or fines, carried out of the reactor. Fines can adversely affect properties of the polymer product. Also, fines can be transported from the reactor into the recycle system by the fluidizing gas. Additionally, during polymerization a phenomenon known as sheeting can occur. Sheeting is the adherence of fused catalyst and resin particles to the walls of a reactor, particularly in the expanded section of the reactor. When the sheets become heavy, they can fall off the walls and plug the product discharge system or clog the distributor plate. These sheets can also contribute to product quality problems by increasing the gel level in end-use products such as plastic containers and films. Sheeting and fines accumulations are collectively referred to as solid particle build-up.

Conventionally, to prevent sheeting from affecting these and other parts of the reactor system, as well as the final polymer product, the reactors are shutdown periodically and the walls are cleaned. When a reactor is down for cleaning, it is typically hydro-blasted using water under high pressure to remove sheets and fines build-up. Since water is a poison, as well as air, the reactor must be purged to remove these poisons and the reactor must be dried. This process is both time consuming and costly. As a result, significant savings can be obtained with the prevention of a single shutdown.

It is also conventional practice to maintain the level of the fluidized bed a few feet below the neck of the expanded section to avoid the accumulation of fines in the expanded section of the reactor. Thus, the volume of the fluidized bed, and therefore the amount of polymer in the reactor is fixed. If one were able to lower the fluidized bed level and maintain a high production rate, the residence time of the polymer would be greatly reduced and the flexibility of the reaction system would be enhanced.

In addition, during the operation of the gas phase fluidized bed polymerization reactor system, there are times when it would be desirable to adjust the powder inventory and/or solids residence time. Catalyst productivity and polymerization rate are affected by the residence time of the solids such as resin and catalyst in the reactor. Control of catalyst productivity and polymerization rate by adjusting residence time would be a desirable method for controlling reactors that are operated in sequence (i.e., staged reactors) to produce products such as bimodal polymers or copolymers. In these types of polymerization processes, control of the proportion of polymer made in each reactor plays a role in determining the properties of the final product and its property consistency.

For product grade transitions, it typically requires about one to three bed turnovers. By altering the fluidized bed volume and therefore the resin particle residence time, the time to achieve the number of turnovers could be lessened. Accordingly, the amount of off-grade polymer product generated during reactor start-up and during grade changes could be reduced.

Accordingly there is a need to improve reactor operation and to improve product quality by reducing sheeting and the accumulation of fines in the expanded section of a reactor as well as in other areas of the reactor system.

SUMMARY OF THE INVENTION

Accordingly, the present invention provides an improved method for polymerizing one or more polyolefins in the presence of a transition metal catalyst in at least one gas phase fluidized bed reactor system, the improvement comprises generating at least one low frequency, high pressure sound wave inside the reactor system which wave has sufficient frequency and pressure to prevent or remove solid particle build-up on interior surfaces of the reactor system.

DETAILED DESCRIPTION OF THE INVENTION

Polymers

Polymers whose gas phase fluidization polymerization process can be benefited by the present invention include polyolefins or alpha olefins such as, for example, linear homopolymers of ethylene, linear copolymers of a major mole percent of ethylene or propylene as the main monomers, and a minor mole percent (up to 30 mole percent) of one or more $C_3$ to $C_8$ alpha olefins, and so-called "sticky polymers", as well as polyvinyl chlorides and elastomers such as polybutadiene. Preferably, the $C_3$ to $C_8$ alpha olefins should not contain any branching on any of their carbon atoms which is closer than the fourth carbon atom. The preferred $C_3$ to $C_8$ alpha olefins are propylene, butene-1, pentene-1, hexene-1, 4-methylpentene-1, heptene-1 and octene-1. This description is not intended to exclude the use of this invention with alpha olefin homopolymer and copolymer resins in which ethylene is not a monomer. Examples of sticky polymers whose polymerization process can be benefited by the present invention include ethylene/propylene rubbers and ethylene/propylene/diene termonomer rubbers, polybutadiene rubbers, high ethylene content propylene/ethylene block copolymers, poly(1-butene) (when produced under certain reaction conditions), very low density (low modulus) polyethylenes, i.e., ethylene butene rubbers or hexene containing terpolymers, ethylene/propylene/ethylidene-norbornene and ethylene/propylene hexadiene terpolymers of low density.

Polymerization Process

In general, the polymerization process is conducted by contacting a stream of one or more alpha olefins in a fluidized bed reactor and substantially in the absence of catalyst poisons such as moisture, oxygen, carbon monoxide, carbon dioxide and acetylene, with a catalytically effective amount of catalyst at a temperature and a pressure sufficient to initiate the polymerization reaction. These polymerization processes are described, for example, in U.S. Pat. Nos. 4,482,687; 4,558,790; 4,994,534; 5,162,463; 5,137,994; 5,187,246; and 5,194,526. It is extremely critical that the poisons be essentially eliminated since only minor amounts (i.e., <2 ppm of carbon monoxide in the recycle gas) have been found to dramatically, adversely affect the polymerization. Typically, the polymerization process is conducted at a pressure ranging from about 10 psi to about 1000 psi, preferably about 200 to 600 psi and a temperature ranging from about 10° C. to about 150° C., preferably about 40° C. to about 115° C. During the polymerization process the superficial gas velocity ranges from about 1 to 3 feet/second, and preferably is about 1.2 to 2.4 feet/second.

The gas phase fluidized bed reactors employed in the polymerization process of the present invention are not critical. A single reactor can be used or multiple reactors (two or more in series or staged) can be utilized. Another type of gas phase reactor which can be used is one or more well stirred or mechanically fluidized tank reactors.

Any catalyst typically employed in gas phase fluidized bed polymerization processes can be employed in the improved polymerization process of the present invention. Such catalysts generally are transition metal catalysts. Such transition metal catalysts can be selected from the group consisting of titanium, vanadium, chromium, cobalt, nickel, zirconium and mixtures thereof. Cocatalysts and catalyst promoters can also be employed along with such catalysts. Typical cocatalysts and catalyst promoters are well known and disclosed, for example, in U.S. Pat. Nos. 4,405,495; 4,508,842; and 5,187,246.

Additionally, the polymerization process of the present invention can include other additives such as fluidization aids, electrostatic eliminating additives, and inert particles. Inert particles can include, for example, carbon black, silica, clay, and talc.

Sound Waves

Sound waves employed in the present invention are of a frequency and pressure sufficient to dislodge sheeting (or sheets), fines, or other particles from the inside surfaces of the reactor system. The sound waves can be in the infrasonic sound region (i.e., low frequency, non-audible waves and referred to herein as infrasonic waves) and in the sonic sound wave range (i.e., audible waves and referred to herein as sonic waves). Infrasonic waves and sonic waves can be employed alone or in combination. Most preferably infrasonic waves are employed in the present invention. Preferably the infrasonic waves have a frequency ranging from about 5 to 30 Hertz (Htz), most preferably 14 to 20 Htz; and they have a pressure level of 90 to 200 decibels (dB), most preferably 100 to 160 dB. Sonic waves in the audible range preferably have a frequency ranging from about 30 to 1000 Htz, most preferably 200 to 400 Htz; and they have a pressure level of about 90 to 200 dB, preferably 120 to 160 dB.

In a preferred embodiment one or more sound waves are directed tangentially or perpendicular to the interior surface or surfaces of the reactor system on which build-up is to be prevented or removed. By tangentially is meant that the sound waves are directed substantially parallel to the contours of the interior surfaces on which build-up occurs. By perpendicular is meant that the sound waves are directed substantially perpendicular to the interior surfaces on which build-up may occur. Most preferably the sound waves are directed tangentially to the interior surface to be cleaned. The sound waves can be activated continually or intermittently. Preferably the sound waves are activated intermittently. Sound waves employed in the present invention have an activation time ranging from about 5 seconds to continually, preferably from about 10 seconds to 30 seconds. The cycle time of the sound waves can range from about 1 minute to continually, and preferably is 5 minutes to 1 hour. Activation time is the period of time that a device is producing sound waves. Cycle time is the time interval between activations of a device.

Such sound waves employed in the present invention can be produced by one or more sound producing devices. Preferably 1 to 10 such sound producing devices are placed throughout the reactor system. And, of these, preferably 1 to 4 devices are placed inside the reactor itself. Sound wave producing devices can be installed in any part of the reaction system such as for example in a heat exchanger, recycle line, below a distributor plate, a straight section of a reactor, an expanded section of a reactor, and preferably in a transition section of a reactor just above a straight section. Additionally such sound wave producing devices can be installed in downstream processing areas such as near or in a purge bin, transfer lines, bag house, and storage bins.

In the present invention one or more sound wave producing devices capable of withstanding the polymerization temperatures and are employed to resonate particle deposits and cause them to dislodge from interior surfaces. Accordingly, particle build-up is affected by the production of one or more low frequency, high pressure sound waves. The sound waves create transitional components of hydrodynamic shear flow which aid in removing particles from the surfaces of the reactor system. The sound energy generated by the device also breaks particle-to-particle bonds and those between a particle and the interior surface of the reactor or of the reactor system. In turn the particles fall by gravity or are removed by a gas stream.

Sound wave producing devices are commercially available as INSONEX® and SONOFORCE® horns from Kockum-Sonics (Sweden) described in EPO 189 386 A3 and as Sound-Off® (Model 360) Fluidizer from Drayton Corp. (Jacksonville, Ala.). The INSONEX® is an infrasound producing device (i.e., low frequency {15.0–19.9 Hz}, high energy {130 dB} driven by compressed air or other compressed gases. The infrasound energy of this device is generated through a long resonance tube by passing a given amount of gas through it. A central control sends a pulse signal to two 24 volt DC solenoid valves which control the valves. The pulsing of the valves regulates the pulse of the gas through the tube and thus determines the frequency. The gas pressure requirement and consumption are application dependent. For example, for a reactor system operating at 300 psig pressure and 100° C., the consumption of motive gas for the device would be about 8000 lb/hr at about 100 psig pressure drop across the unit. Sound-Off® is an audible sound wave producing device (i.e., low frequency {100–400 Hz}, high energy {145 dB}) which operates by means of a vibrating titanium or stainless steel diaphragm driven by compressed air or other gases. These devices are constructed of cast stainless steel or iron and have only one moving part, the metal diaphragm. The devices can be either mounted to a standard nozzle or to a tangentially directed nozzle.

In the present invention the use of sound waves improves a gas phase fluidized bed polymerization process by allowing the reactor to be operated for longer periods of time before shutdown for cleaning and permits a reduction in the amount of off-grade polymer. The use of sound waves to minimize fines accumulation allows for adjustment in the level of the fluidized bed, and, therefore, the amount of polymer in the reactor. This provides a way to control polymer residence time and catalyst productivity with less risk of sheeting in the reactor system. With the use of sound waves the amount of a fluidization aid employed in a polymerization process can be decreased or eliminated. When sound waves are employed, bridging, a well known phenomenon of particle solid build-up in a bridge-like pattern in purge bins, can be eliminated.

The following examples further illustrate the present invention.

EXAMPLES

At atmospheric conditions, a cold model system comprising a fluidized bed made of Plexiglas® (3 feet diameter), a compressor which circulated air as the fluidizing medium, and a recycle pipe was used to visually determine the effectiveness of using infrasonic and sonic sound waves to remove particles from the fluidized bed system. The fluidizing bed containing polyethylene resin was held at a given superficial gas velocity for a given period of time, typically 5 to 10 minutes, which resulted in a build-up of resin particles in the expanded section of the reactor portion of the cold model. Air was used to fluidize resin particles to a height of about 4 feet and superficial gas velocity was regulated manually. The gas used as the medium for the sound wave producing devices was compressed air which was supplied by three 16 cubic foot cylinders connected in parallel. The cylinders were used to ensure sufficient volume was supplied to the sound wave producing devices. During operation, the cylinders were pressured to a desired amount as set forth in Table 1 for each example. The initial pressure and final pressure of the cylinders were recorded to monitor the amount of air flow being used during testing. The effective ranking ranged from 1 to 6 with 1 being the best rating obtained. In Examples 1 through 14 the sound wave producing device was an infrasonic sound wave producing-type. It was mounted to a straight nozzle in the expanded section of the fluidized bed. The sound pressure wave was generated by passing a controlled amount of compressed air through the tube. Examples 15 to 16 did not use a sound wave producing device, only a pipe. In Examples 17 through 20 the sound producing device was an audible sound wave producing-type. When fines (resin particles) had accumulated in the expanded section, the sound wave producing device was activated. The activation time (i.e., the time during which the sound wave producing device was producing sound waves) varied from 5 to 15 seconds as set forth in Table 1.

In Table 1, Examples 1 through 7 demonstrate the effect of the sound wave frequency in the removal of particles from the expanded section of the fluidized bed. Visual inspection revealed that the optimum frequency was about 16 to 17 Htz.. (Examples 5 and 7). In Examples 5 and 7 the fines were completely removed from the expanded portion of the fluidized bed as visualized by an omni-directional, turbulent flow that extended from the top of the fluidized bed dome extending to the straight sided section of the Plexiglas® fluidized bed itself.

Examples 8 through 10 in Table 1 demonstrate the effect of activation time of the sound producing device on particle removal. From these examples, it was noted that even with 5 seconds, the fines build-up was removed from the expanded section of the fluidized bed. And, as the activation time was increased, the effectiveness of particle removal also increased. However, the build-up in the straight portion of the fluidized bed was not alleviated.

Examples 11 and 12 in Table 1 were performed to determine the effect of the superficial gas velocity on the effectiveness of the sound wave producing device. From these examples, it appeared that particle removal was unaffected by superficial gas velocity.

In Table 1, cold model examples using an infrasonic sound wave producing device, Examples 13 and 14 were performed to demonstrate the effect of gas supply pressure alone on the effectiveness of particle removal. The compressed gas pressure was tested at 60 psig and 40 psig versus the maximum available (82 psig). In both instances, some particles were removed from the expanded section, even though gas movement was lower than 82 psig.

Examples 15 and 16, which did not use a sound wave producing device, illustrated that the sound pressure wave was mainly responsible for removal of the fines and not the momentum of the gas alone moving through the tube. In these examples, the same volume of air was passed through the same nozzle entering the fluidized bed without employing resonance. In Example 15, particles were removed only from the opposite side of the fluidized bed and there was no visual evidence of gas movement in the expanded section or in the straight sided section of the fluidized bed. At 40 psig (Example 16), particle removal was virtually non-existent. When these examples are compared to Example 14 (40 psig) using sound resonance, it is evident that sound waves and not moving gas removed particles.

When an audible sound wave producing device (horn producing sound pressure waves by means of a vibrating plate) was employed (Examples 17 through 20), it was noted that there was a slight movement or swirling of fines and the vibration caused the fluidized bed to vibrate which in turn loosened some of the particles.

TABLE 1

| Example | SGV (ft/sec) | Frequency (Htz) | Initial Gas Pressure (psig) | Final Gas Pressure (psig) | Activation Time (seconds) | Effectiveness Ranking |
| --- | --- | --- | --- | --- | --- | --- |
| 1 | 1.8 | 10 | 82 | 62 | 15 | 5 |

TABLE 1-continued

| Example | SGV (ft/sec) | Frequency (Htz) | Initial Gas Pressure (psig) | Final Gas Pressure (psig) | Activation Time (seconds) | Effectiveness Ranking |
| --- | --- | --- | --- | --- | --- | --- |
| 2 | 1.8 | 15 | 82 | 62 | 15 | 4 |
| 3 | 1.8 | 20 | 82 | 57 | 15 | 3 |
| 4 | 1.8 | 25 | 82 | 52 | 15 | 6 |
| 5 | 1.8 | 17 | 82 | 62 | 15 | 1 |
| 6 | 1.8 | 18 | 82 | 62 | 15 | 2 |
| 7 | 1.8 | 16 | 82 | 62 | 15 | 1 |
| 8 | 1.8 | 16.6 | 82 | >62 | 5 | 3 |
| 9 | 1.8 | 16.6 | 82 | >62 | 10 | 2 |
| 10 | 1.8 | 16.6 | 82 | 62 | 15 | 1 |
| 11 | 1.5 | 16.6 | 82 | 62 | 15 | No Distinction |
| 12 | 2.5 | 16.6 | 82 | 62 | 15 | No Distinction |
| 13 | 1.8 | 16.6 | 60 | 40 | 15 | 1 |
| 14 | 1.8 | 16.6 | 40 | 24 | 15 | 2 |
| 15 | 1.8 | Not Applicable | 80 | 60 | 15 | ** |
| 16 | 1.8 | Not Applicable | 40 | 24 | 15 | ++ |
| 17 | 1.8 | 230 | 80 | 72 | 15 | Not Applicable |
| 18 | 1.8 | 230 | 80 | 72 | 15 | Not Applicable |
| 19 | 1.8 | 230 | 80 | 72 | 15 | Not Applicable |
| 20 | 1.8 | 230 | 80 | 72 | 15 | Not Applicable |

**minimal particle removal
++ no particle removal

Example 21

The effect of using a tangentially mounted nozzle attached to the resonance tube was analyzed. Examples 11, 12, 13 and 14 were repeated as closely as the controls allowed except that a tangentially mounted nozzle was used in place of a straight nozzle. Multiple combinations of varying superficial gas velocity (SGV) and supply pressure were evaluated to attempt to match the tests listed above. Results showed that a sound wave producing device mounted tangentially to the particles to be removed improved the effectiveness of removal of particle build-up in the expanded section.

Example 22

Commercial Scale Polymer Grade Change

A gas phase fluidized bed polyolefin reaction system containing a fluidized bed volume of about 5000 cubic feet which contains about 100,000 pounds of polymer resin is used.

The reactor is operated at a production rate of about 25,000 pounds per hour or about 4 hours residence time. The reaction system produces a polyethylene product having a melt index of 2 g/10 min and a density of 0.924 g/cm$^3$ using a titanium based catalyst and an aluminum alkyl co-catalyst while operating at the following conditions:

Reactor pressure: 300 psig
Reactor temperature: 91° C.
Ethylene partial pressure: 110 psia
1-Hexene to ethylene molar ratio: 0.105
Hydrogen to ethylene molar ratio: 0.186

In order to transition to a different grade polymer product, having a melt index of 5 g/10 min and a density of 0.934 g/cm$^3$, sonic devices, mounted to tangential nozzles in the reactor expanded section, are activated for about 15 seconds approximately every 15 minutes. Once it is evident that the fines are being removed from the expanded section as indicated by the expanded section skin thermocouples, the fluidized bed level is lowered slowly to about 50% of the normal operating level, while maintaining a constant production rate. During this period, the sonic devices are activated at values of about 15 to 20 seconds approximately every 15 minutes. After the bed level reaches the 50% operating level, the conditions in the reactor are adjusted as follows to make the different grade polyethylene product having a melt index of 5 g/10 min and a density of 0.934 g/cm$^3$:

Reactor pressure: 300 psig
Reactor temperature: 96° C.
Ethylene partial pressure: 160 psia
1-Hexene to ethylene molar ratio: 0.069
Hydrogen to ethylene molar ratio: 0.290

Once these conditions are achieved in the reactor, and the product reaches specifications, the bed level is returned to the normal operating level to complete the grade transition. The sonic device makes it possible to do a grade transition in about 6 hours as compared to the 12 hours commonly practiced. In addition, the quantity of lower value, non-specification polymer produced during the grade transition is reduced by approximately 50%.

Example 23

Use of Sound Waves to Improve Product Quality

Example 22 is substantially repeated, except that the catalyst system employed is chromium based and the fluidized bed is operated at the normal operating level. The reactor is operating at the following conditions:

Reactor pressure: 350 psig
Reactor temperature: 106° C.
Ethylene partial pressure: 192 psia
1-Hexene to ethylene molar ratio: 0.0016
Hydrogen to ethylene molar ratio: 0.17
Polymer flow index: 40 g/10 min
Polymer density: 0.955 g/cm$^3$ During operation, accumulation of particles on the expanded section of the reaction system is indicated by the use of skin thermocouples. If these particles are allowed to remain on the internal reaction surfaces, they form high molecular weight particles which fall from the surfaces. These high molecular weight particles are commonly subsequently removed with the other resin resulting in poor quality. However, in this example, two sonic devices having a frequency of about 16 to 17 Htz installed in the expanded section in a tangential direction are activated for a period of about 30 seconds about every 5 minutes. As a consequence, the particles adhering to the surfaces are removed preventing them from forming gels or poor quality product. The sonic devices are then activated at less frequent intervals, about 15 seconds every 15 minutes to ensure that particles do not again attach to the interval reactor surfaces. The sonic devices, by preventing the formation of high molecular weight particles and subsequent contamination of the fluidized bed with polymeric gels, avoids the necessity of reclassifying the polymer product to a lower value, non-specification grade.

Example 24

Use of Sold Waves in Staged Reactors

Example 22 is substantially repeated, except that the reaction system employed is a multiple (in this case two) reactor system as described in U.S. Pat. Nos. 5,047,468; 5,126,398; and 5,149,738. For staged reactor polymer products, the final bi- or multi-modal polyolefin product properties are dependent upon the molecular weight distribution which is controlled, in part, by the production rate split. The production rate split is defined as the amount of high molecular weight component in the final bimodal resin. Since the first reactor of the multiple reactor system serves as the catalyst feed for the next, limited split combinations are achievable (given a non-changeable fluidized bed reactor volume) because of catalyst decay and limits on ethylene partial pressure.

The reactors, referred to in this example as Rx1 for the first reactor in the sequence and Rx2 for the second reactor in the sequence are used. Rx1 produces a high molecular weight polyethylene resin having a flow index of 0.45 g/10 min and a density of 0.930 g/cm$^3$. Rx2 produces a low molecular weight polyethylene resin having a melt index of 1000 g/10 min and a density of 0.968 g/cm$^3$. The conditions for the reactors are as follows:

|  | R × 1 | R × 2 |
| --- | --- | --- |
| Reactor pressure: | 300 psig | 300 psig |
| Reactor temperature: | 85° C. | 110° C. |
| Ethylene partial pressure: | 40 psia | 90 psia |
| 1-Hexene to ethylene molar ratio: | 0.033 | 0.010 |
| Hydrogen to ethylene molar ratio: | 0.034 | 1.700 |

The production rate for the first reactor is about 39,000 lb/hr and the second reactor total production rate is about 65,000 lb/hr resulting in a split of about 0.6 with a final bimodal resin product having a flow index of around 8 g/10 min and a density of 0.948 g/cm$^3$. Changing the split to 0.3 while maintaining the same overall production rate to produce a different bimodal product having an overall flow index of 144 g/10 min and density of 0.958 g/cm$^3$ is accomplished by activating a sonic device attached to a standard nozzle in the transition section of the reactor for about 30 seconds approximately every 15 minutes. The fluidized bed level in Rx1 is lowered from 100% to 50% of the normal operating height. The ethylene partial pressures in both reactors are adjusted to achieve the final split of 0.3. From this example, it can be seen that without lowering the fluidized bed level, the split could not have been achieved because the residence time in Rx1 would have lowered the catalyst activity of the resin entering Rx2, thus the required production rate from Rx2 could not have been achieved. Likewise, lowering the ethylene partial pressure in the first reactor and increasing catalyst feed rate is not possible because the ethylene partial pressure drops to an uncontrollable low pressure.

Example 25

Use of Sound Waves for Sticky Polymers

A reactor as described in U.S. Pat. No. 5,264,506 is started at 50° C. using a vanadium catalyst to produce EPDM (ethylene-propylene-diene) granular resin. The following conditions are maintained throughout the run:

Reactor pressure: 300 psig

Reactor temperature: 50° C.

Ethylene partial pressure: 90 psia

1-Propylene to ethylene molar ratio: 0.8

Hydrogen to ethylene molar ratio: 0.001

Ethylidene-norbornene concentration: 60–80 ppm

Carbon black is added intermittently to the reactor to keep the static activity level under control and to prevent the sticky polymer from agglomerating. During polymerization, the amount of carbon black is allowed to build to approximately 3 times the customer specification level to minimize polymer build-up in the expanded section. A sonic device attached to a nozzle in the expanded section of the reactor above the bed level is subsequently activated for about 30 seconds about every 5 minutes. The sonic device cleans the EPDM material adhering to the reactor surfaces. The amount of carbon black is then reduced to the normal customer specification. The reactor continues to operate at this low carbon level.

What is claimed is:

1. An improved method for polymerizing one or more polyolefins in the presence of a transition metal catalyst in at least one gas phase fluidized bed reactor, the improvement comprising generating at least one low frequency, high pressure sound wave inside a reactor system, which wave has sufficient frequency and pressure to prevent or remove solid particle build-up on interior surfaces of the reactor system.

2. The method according to claim 1 wherein the sound wave is directed tangentially or perpendicular to the surface to be cleaned.

3. The method of claim 2 wherein the sound wave is selected from the group consisting of (a) an infrasonic wave having a frequency ranging from about 10 to 30 Htz and a pressure ranging from about 90 to 200 dB; and (b) a sonic wave having a frequency ranging from about 30 to 1000 Htz and a pressure ranging from about 90 to 200 dB.

4. The method of claim 3 wherein 1 to 10 sound wave producing devices are introduced into the reactor system in one or more of an expanded section of a reactor, a heat exchanger, a recycle line, below a distributor plate, a purge bin, and a bag house.

5. The method of claim 3 wherein the pressure in a reactor of the gas phase fluidized bed reactor system ranges from about 10 to 1000 psi and the temperature ranges from about 10° C. to 150° C., and the superficial gas velocity ranges from about 1 to 3 feet/second.

6. The method of claim 3 wherein the polyolefin a linear homopolymer of ethylene or a linear copolymer comprised of a major mole percent of ethylene or propylene and a minor mole percent of one or more $C_3$ to $C_8$ alpha olefins.

7. The method of claim 1 wherein the polyolefin is a sticky polymer selected from the group consisting of (i) ethylene/propylene rubbers;

(ii) ethylene/propylene/diene termonomer rubbers;

(iii) polybutadiene rubbers;

(iv) high ethylene content propylene/ethylene block copolymers;

(v) ethylene/propylene hexadiene terpolymers;

(vi) ethylene/propylene/ethylidene norbornene; and (vii) poly (1-butene).

8. The method of claim 1 wherein the catalyst is a transition metal catalyst selected from the group consisting of titanium, vanadium, chromium, cobalt, nickel, zirconium, and mixtures thereof.

9. The method of claim 8 wherein one or more catalyst promoter and co-catalyst are employed.

* * * * *